United States Patent [19]
Hazen et al.

[11] Patent Number: 6,102,115
[45] Date of Patent: Aug. 15, 2000

[54] INTEGRAL STANDOFF OF INDUCTION SONDES TO MINIMIZE CORRECTION OF BOREHOLE CONDUCTIVITY EFFECTS

[75] Inventors: Gary A. Hazen; Stanley R. Thomas, both of Houston; R. David Mathison, Jr., Sugar Land; James Joseph Walulik, Houston, all of Tex.

[73] Assignee: Schlumberger Technology Corporation, Houston, Tex.

[21] Appl. No.: 09/012,499

[22] Filed: Jan. 23, 1998

[51] Int. Cl.⁷ .................................................. E21B 43/00
[52] U.S. Cl. ...................... 166/65.1; 166/250.16
[58] Field of Search ................ 166/65.1, 250.16; 324/234, 242, 338, 339, 346

[56] References Cited

U.S. PATENT DOCUMENTS

| | | |
|---|---|---|
| 4,009,434 | 2/1977 | McKinlay et al. ............... 364/422 X |
| 4,511,843 | 4/1985 | Thoraval ........................... 324/338 |
| 4,651,101 | 3/1987 | Barber et al. . |
| 4,873,488 | 10/1989 | Barber et al. . |
| 5,668,475 | 9/1997 | Orban et al. . |

*Primary Examiner*—Roger Schoeppel
*Attorney, Agent, or Firm*—John J. Ryberg; Brigitte L. Jeffery; Victor H. Segura

[57] ABSTRACT

This disclosure sets out an induction logging tool enclosed in a cylindrical shell between top and bottom located end connected subs of larger diameter. The ends are larger; they define a standoff distance above a specified minimum to enable operation in a well borehole without centralizers.

24 Claims, 3 Drawing Sheets

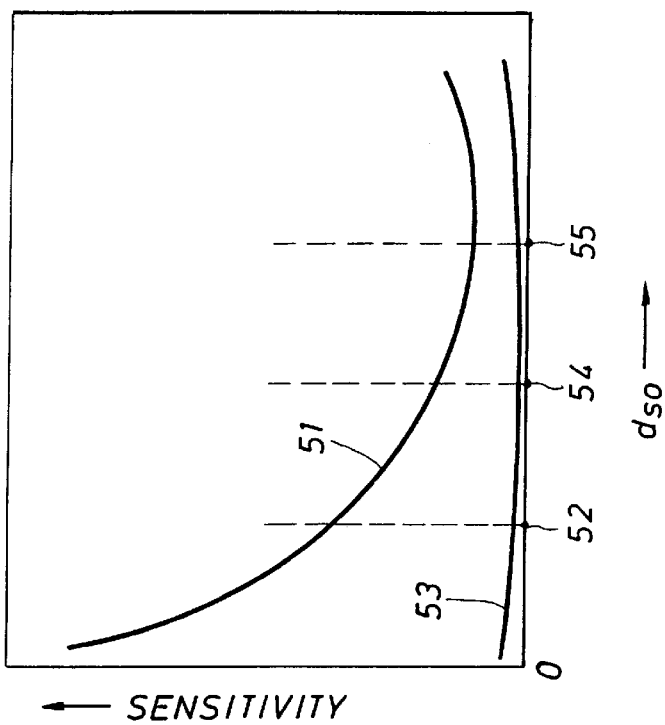
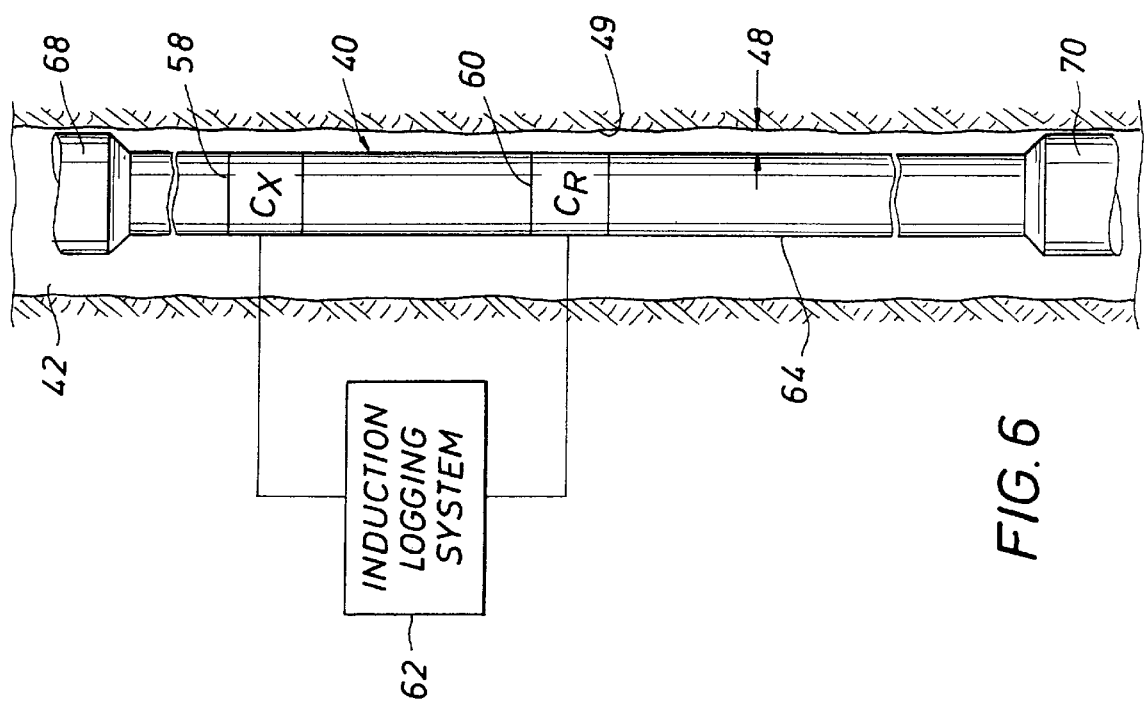

INTEGRAL STANDOFF OF INDUCTION SONDES TO MINIMIZE CORRECTION OF BOREHOLE CONDUCTIVITY EFFECTS

BACKGROUND OF THE INVENTION

A logging sonde, or "tool", typically makes measurements radially outwardly in all directions from the tool. This is especially true with a resistivity logging tool. In effect, such a tool without azimuthal focusing measures the bulk resistance of the formation surrounding a well borehole. Changes in the measured resistance are indicative of changes in formation materials penetrated by the borehole, and such changes can be used to determine whether or not the formations contain hydrocarbons within the pore space as opposed to saline water.

Measurements with an induction logging tool are made by forming a field which extends into the formation. This involves forming a field pattern involving one or more coils carried in the induction logging tool. While the coils may be complex arrays, the construction of the arrays, the operating frequencies and other variables involved are merely the backdrop for the present disclosure. More specifically, this disclosure is directed to an aspect of tool positioning so that the data obtained from an induction log can be evaluated. That evaluation is not easily accomplished. The operation and the data obtained from such logging tools must be processed to obtain a useful resistivity log. Such processing includes correcting measured signals for adverse effects of the borehole. One aspect of the processing is involved in the standoff distance between the tool and the penetrated formation.

The tool is lowered preferably on a wireline into an open borehole to make measurements in the formations. The tool can also be operated attached to a drill string, coil tubing, or drill pipe. The borehole is normally filled with drilling fluid, normally water or oil with clay based additives to increase weight. This creates a zone of borehole effects. The zone of borehole effects includes at least the open well borehole. There may be a thin layer of the weight material from the drilling mud which is defined as a mud cake deposited against the wall. The solvent in the drilling fluid will soak into the adjacent formation and thereby change the nature of the formation at least for a little distance into the formation. These borehole effects normally must be removed from the calculations which are carried out in evaluating a resistivity log. One important aspect of the data reduction routine is determining the physical alignment of the logging tool with the open hole in which measurements are made. Even with a small diameter induction logging tool, centralizers are mounted on the logging tool to position it along the centerline axis of the open hole. One typical assumption is that the tool is positioned on the centerline axis. This centerline positioning is an important aspect of running the tool into the well borehole. Briefly, centralizers are mounted along the length of the tool body so that the centralizers move the tool to the desired location.

By contrast, there are a number of logging tools which require that the tool be eccentered or even "jammed" against the sidewall of the open borehole. It is necessary for operation in this sort of tool to have facial contact between the tool and the formation. Typically, the tool will mount some kind of measurement shoe broadly positioned against the sidewall of the well borehole. That position is achieved by decentralizing the tool with a bow spring which curves to the side, or, alternately, by a powered decentralizing caliper arm well known in the art. The bow spring decentralizes the tool and jams it against the formation so that the desired kind of physical coupling is achieved. The bow spring is located at a particular side of the cylindrical tool body so that the shoe contact is achieved. A single tool string comprising several different serially connected elongated tools thus will require a knuckle between the portion that preferably operates on the centerline, and the portion which best operates jammed against the sidewall of the well borehole.

Great efforts are made as noted to centralize an induction logging tool where it is connected in a tool string, but located below tools which operate best when eccentered against the side of the well borehole. Centralizers below the knuckle are required to overcome the positioning of the decentralizing bow springs. Typically, two or three eccentering bow springs or the like are included above the knuckle so that portion of the tool string is jammed to the side. Below the knuckle, the remainder of the tool is intended to be located on the centerline axis of the borehole. There are certain symmetries which result from the collection of data from that location.

With an induction logging tool, it is important to have some spacing between the induction logging tool and the adjacent formations. In the prior art, the induction tool is usually operated centralized or at least at a fixed standoff within a cylindrical well borehole. Sometimes, however, the formations simply do not drill in a perfect circle. The hole formed by the drill bit may collapse partially on one side or the other and create a different shape hole. In some instances, unconsolidated sand may wash away. In many other instances, the drill bit will drill a round hole, but drill collars above the drill bit at a particular location may form a "key seat" because the hole drifts. The circular hole will be distorted to a different shape. As will be understood, many of these problems can arise in lesser or greater amount without any information at the surface indicating that such problem has occurred, or for that matter, that the hole is perfectly cylindrical in shape. The centralizers, however, are included so that the tool is positioned at the idealized fixed distance from the well borehole, even where it is suspended below logging tools preferably eccentered for operation. This controls the tool "standoff", which is defined as the spacing between the outside diameter of the tool and the wall of the well borehole. The standoff is important to assure that predictable and controllable interactions are achieved between the tool and the formation penetrated by the borehole so that the induction log is completed, and the data can be reduced using repetitive assumptions.

In actuality, positioning the induction logging tool at the centerline position of the well borehole decreases the sensitivity of the measured response to resistivity (conductivity) of the formation, but also decreases the sensitivity of the measurement to the resistivity (conductivity) of the material within and immediately adjacent to the borehole. Centralized operation provides more than enough standoff so that the electromagnetic flux in the borehole provides adequate data indicative of formation and borehole effects. If the tool is moved away from the centerline position, sensitivity to the formation is increased provided it is not moved so far that it is jammed against the borehole wall. Sensitivity to borehole effects is also increased. When the tool is against or very near the borehole wall, the measured data is much less reliable and special efforts have to be developed and undertaken in data reduction to remove the distortion arising from that tool position. In many cases, the data is rendered quantitatively unusable. In other words, a standoff that is sufficiently wrong yields data that may not be useful. Restated, when the tool is jammed against the side wall, the data may be loaded with undesirable effects distorting readings of the tool.

SUMMARY OF THE INVENTION

One object of the present invention is to eliminate auxiliary centralizers for induction tools. Auxiliary centralizers, whether bow springs or powered backup arms, add to the cost, complexity, and operational requirements of the tool string and decrease tool reliability. Auxiliary centralizers are especially undesirable in hostile environment operation, in highly deviated boreholes, and in relatively small diameter boreholes. It is, therefore, highly desirable to eliminate auxiliary centralizers and permit the induction tool to be positioned in the well borehole and readily contact the sidewall. The tool, however, is constructed with a specified structural offset which defines the standoff as a result of manufacturing the tool in accordance with the teachings of this disclosure. That tool is able to still conduct logging operations, even where it is jammed against the borehole sidewall, since the structural offsets provide the needed standoff of transmitter and receiver coils within the tool. When jamming occurs, what would otherwise be unacceptable data is now acceptable because a fixed, controllable standoff distance has been accomplished with the structural offsets.

The tool of the present disclosure utilizes a fixed, controllable standoff which is integrally built into the tool at the time of fabrication thereby allowing the tool to be operated without auxiliary centralizers. Looking specifically at the induction logging tool of this disclosure, the transmitter and receiver coils are located inside of a sleeve which defines the operative portion of the logging tool. Whether one or many coils are included, they are all located inside an elongate tubular cylindrical sleeve or "shell" formed of a material which is transparent to the electromagnetic field radiation extending through it. Preferably, it has the form of an elongate hollow, tubular sleeve formed of ceramics or plastics or composites thereof. It is located between upper and lower tubular end members or "subs" which have a larger diameter. An important feature is that the larger diameter upper and lower subs cooperate with the smaller diameter central tubular shell to define a standoff region which does not come in contact with the borehole wall. Contact is prevented because the active components inside the shell are located in the standoff region. This standoff spacing is typically about ¼" or more up to about 1".

Another object of the present invention is to increase the quality of the log of formation conductivity (resistivity). This is accomplished by means of controlled standoff. There is a region in which the standoff is controlled so that there is enough space between the tool coils and the borehole sidewall to enable flux to be formed in the standoff gap, while yet positioning the coils closer to the formation at any side so that the closer positioned coils are coupled into the formation with greater sensitivity. Sensitivity of the measured signal to formation is increased as the tool is moved from the borehole centerline toward the borehole wall. Borehole effects in the measured signal are also increased as the tool is moved toward the borehole wall. With auxiliary centralizers removed, the induction tool moves to an eccentered position within the borehole. The diameters of the elongated shell and upper and lower subs of the tool are selected so that the resulting standoff yields good formation sensitivity, and yet the effects of the borehole are well behaved.

Yet another object of the present invention is to provide a logging tool which is reliable and relatively easy to operate within boreholes of high temperature and pressure, or of small diameter, or highly deviated from the vertical. All of these objects are met by eliminating auxiliary centralization equipment and allowing the tool to be operated in the borehole with controlled standoff. Auxiliary standoff equipment adds manufacturing and operational cost to the system, and increases system complexity thereby reducing system reliability.

Another important aspect of the present disclosure is the provision of an induction logging tool which can be located anywhere in a string of eccentered logging tools so that this induction logging tool will provide greater sensitivity while making measurements, and yet will also have adequate standoff to avoid distorting the signals measured in the formations. Again, this aspect is accomplished by constructing the induction logging tool with a controlled standoff for eccentric operation.

BRIEF DESCRIPTION OF THE DRAWINGS

The advantages of the present invention will become apparent from the following description of the accompanying drawings. It is to be understood that the drawings are to be used for the purpose of illustration only, and not as a definition of the invention.

In the drawings:

FIG. 5 is a graph showing enhanced sensitivity as the tool is moved away from a centerline position;

FIG. 6 shows the induction logging tool of the present invention positioned against the side of the well borehole while yet having a proper standoff distance.

DETAILED DESCRIPTION OF THE PREFERRED EMBODIMENT

Figure 1:
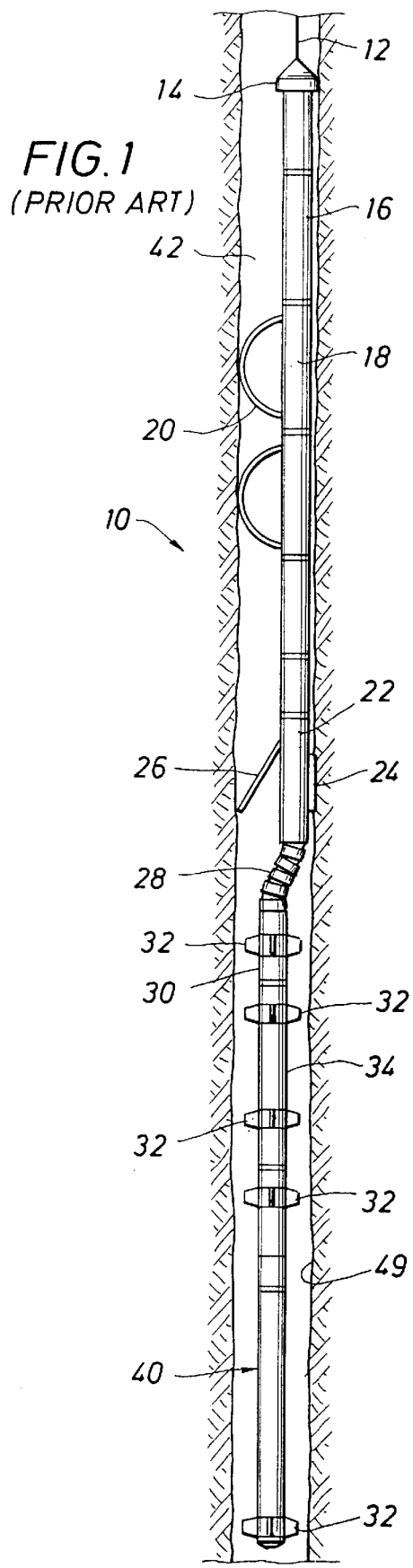
FIG. 1 shows a logging string of several different tools serially connected to be lowered in a well borehole where some of the tools are eccentered and some are centralized and represents the approach of the prior art.

Attention is now directed to FIG. 1 of the drawings which shows a prior art string of several logging tools which are joined together for logging in a well borehole 42. It is assumed that the well borehole 42 has been drilled to some depth, and remains as an open hole, and that the open hole is filled with drilling fluid to a sufficient depth. The drilling fluid is left in the well to prevent blowouts. Moreover, the drilling fluid helps avoid collapse of the borehole sidewall. The drilling fluid is often referred to as drilling "mud", and is typically formed of water or oil as a solvent with suspended clay or other weighting particles. Sometimes, oil based additives can be used. Other solvents can be added as well as other weight materials.

The logging tool string in FIG. 1, generally identified with the numeral 10, refers to several logging instruments which are connected serially. The tool string 10 connects with a multiple strand wireline cable 12 which extends to the surface of the earth and provides a strength member as well as a communication pathway between the logging tool string 10 and the surface. The logging tool string 10 is lowered typically to the bottom of the well borehole 42 by deploying cable 12 from a surface winch (not shown). The tool string 10 is then conveyed up the borehole 42 by retrieving cable 12 with the winch. Data is obtained by logging the well as the tool travels along the well borehole 42. In this area or region, the well is open hole. The wireline 12 connects with a fishing neck 14 at the upper end. That connects serially with a first logging tool 16 and a second logging tool 18. These are tools which operate best when forced or "jammed" against the borehole sidewall 49. In other words, these tools are "eccentered" logging tools within the tool string 10. Logging tools 16 and 18 are forced to the side by one or more bow springs 20 or other alternate equipment, such as powered decentralizing backup arms. Indeed, a logging tool 22 is included which has a logging shoe 24 which functions best when jammed against the sidewall 49. The logging shoe 24 is forced against the sidewall by a protruding leg 26 which extends radially outwardly at an angle to assure that the shoe 24 is pushed against the sidewall. While the bow springs 20 are passive, the arm 26 typically is moved to the cantilevered positioned illustrated by some kind of power rotating device which actively forces the logging tool to the borehole side 49, thereby providing the necessary contact for the shoe 24. The tool string 10 then includes a knuckle 28. The knuckle provides an off centered mounting for a sub 30. The sub 30 supports a centralizer 32. The centralizer 32 is replicated at several locations along the lower length of the tool string 10. It is shown at several locations to assure that the lower portion of the tool string is located approximately coincident with the centerline axis of the well borehole.

Still referring to FIG. 1, a first, centralized logging tool 34 is shown in the tool string 10 between a pair of centralizers 32. Prior art systems preferably operate from the centralized position within the borehole 42. The knuckle 28 deflects the tool string so that it hangs out into the central regions of the borehole and the centralizers 32 restore this tool to that position. An induction logging tool 40 is also included. It is also forced to the center of the borehole 42 by the centralizers 32. The centralizers 32 have different forms including offsetting bow springs or offsetting powered centralizers, and the precise shape of the several centralizers can vary. Centralization can also be achieved by fixed, solid standoffs. It is believed that the shape is well known by those skilled in the art, and that further details are not required to disclose the centralizers and how they operate.

In summary, the prior art logging tool string 10 is made up of several different tools. They are grouped so that those which operate best when eccentered are located serially. Those which operate best on the centerline axis (achieved by several centralizers) are also serially arranged. The eccentered logging tools are above the knuckle 28 while the centralized logging tools are below the knuckle 28. Interestingly, the system can be inverted by moving the eccentered tools below the knuckle 28. This would then locate the centralized logging tools above the knuckle at a centerline location in the well borehole.

Figure 2:
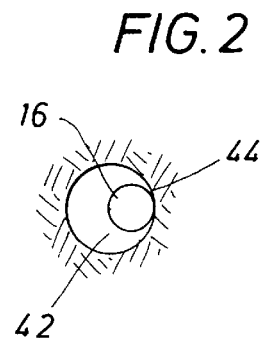
FIG. 2 is a sectional view through a well borehole showing an eccentered tool in the borehole.
Figure 3:
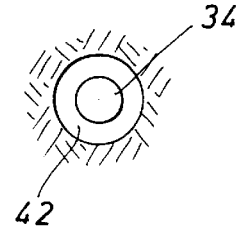
FIG. 3 is a view similar to FIG. 2 showing a centralized logging tool in the well borehole.
Figure 4:
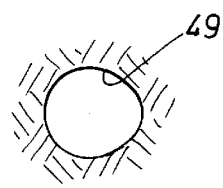
FIG. 4 shows a distorted well borehole profile which represents a departure from the cylindrical well boreholes illustrated in FIGS. 2 and 3.

FIGS. 2, 3 and 4 together illustrate key important aspects of operation. In FIG. 2, the tool 16 is located to the side in close proximity to one part of the well borehole. FIG. 2 shows the borehole 42 with azimuthal region 44 located on the east side of the well borehole. The eccentered portion of the logging tool string 10 (see FIG. 1) will position the logging tool 16 at that location to make measurements. Recall again that the tool 16 is one of those which operates best when positioned against the borehole sidewall 49. FIG. 3, on the other hand, shows the logging tool 34 which is centered within the borehole 42. It is the type of tool which operates best when located along a centerline position. FIG. 4 has been included to show that the cylindrical well borehole shapes achieved in theory may not always be achieved in practice. The well borehole wall 49 is distorted as a non round hole. This can sometimes occur as a result of previously discussed key seating of the drill string.

It has been discovered that an induction logging tool provides data which is reliable, and which can be readily evaluated when the tool is positioned eccentrically within the borehole. FIG. 5 is a plot of two sensitivity components measured by the tool as a function of tool standoff, $d_{so}$. Sensitivity is plotted along the ordinate, and standoff is plotted along the abscissa. Curve 53 represents the sensitivity component of the measured signal which responds to formation resistivity (conductivity). Curve 51 represents the sensitivity component of the measured signal which responds to the resistivity (conductivity) of the borehole. As mentioned previously, formation sensitivity represented by the curve 53 is minimal when the tool is centered within the well borehole, as represented by a standoff identified by the numeral 55, and increases as standoff is decreased (or increased past the point 55 as the tool is again eccentered and approaches the opposite borehole wall). Likewise, as mentioned previously, borehole sensitivity represented by the curve 51 is minimal when the tool is centered within the well borehole at $d_{so}$ identified as 55, and increases as $d_{50}$ is decreased (or increased past the point 55 until the tool is eccentered against the opposite borehole wall). For values of $d_{so}$ falling within the region bounded by values 52 and 54, the curve 51 has been found to have somewhat less curvature indicating that the effects of borehole conditions are well behaved, and corrections for these borehole effects to the total measured signal can be effectively made. For value of $d_{so}$ less than the value identified as 52, the effect increases non-linearly, but is ill behaved making operation and borehole correction for this magnitude of standoff very difficult. By fabricating the induction logging tool with a fixed standoff $d_{so}$ falling within the range bounded by the values identified as 52 and 54, a reliable measure of formation resistivity, corrected for borehole resistivity, is obtained. The significance of this will be made more clear in the description of FIG. 6 of the drawings.

The present invention is generally identified as the induction logging tool 40 shown in FIG. 6. It is shown devoid of centralizers. Moreover, the logging tool is constructed with a transmitter coil $C_x$. In conjunction with a receiving coil $C_r$, and associated systems equipment 62, induction measurements are made. The coils 58 and 60 can be few or many turns, they can operate with different spacings and frequencies, and they can be subjected to different sweep routines. They all collaborate with the induction logging system 62 so that an induction log of the formation can be obtained. The present invention is deemed appropriate for practically any type of induction logging tool with any kind of axial scheme or arrangement of transmitter and receiver coils. The coils 58,60 are located on the interior of an elongate tubular shell 64 which is made of materials to be discussed below. The tubular cylindrical shell serves as a housing confining the coils 58,60 on the interior.

Referring again to FIG. 6, the tubular, cylindrical shell 64 cooperates with an upper sub 68 and a lower sub 70 to define the standoff gap 48, which is the standoff distance $d_{so}$ between the induction logging tool and wall 49 of the well borehole 42. FIG. 6 is an enlarged view and shows that the well borehole sidewall 49 is more irregular than shown in FIG. 1. Not only is the sidewall 49 irregular at the surface, it may be circular but it can just as easily have a non circular shape as exemplified in FIG. 4. The spacing 48 is the standoff $d_{so}$. As the standoff 48 is changed, certain factors come into play which need to be correlated between the optimum standoff range 52–54 shown in FIG. 5 and the specific standoff illustrated in FIG. 6. Structurally, the elongate cylindrical shell 64 comprises a sleeve of electrically non conductive material preferably with a magnetic permeability of about one. It is captured between the upper sub 68 and the lower sub 70. The two subs 68,70 are identical in outer diameter but different primarily in physical location. In a symmetrical sense, they both provide a defining shoulder, better seen in FIG. 7, which enables the standoff distance 48 to be illustrated between the shell 64 and the borehole sidewall 49. For a deviated borehole, an intermediate sub, having a diameter identical to subs 68, 70, can be positioned on the sleeve between subs 68 and 70 to maintain the standoff range in the presence of borehole curvature.

Figure 7:
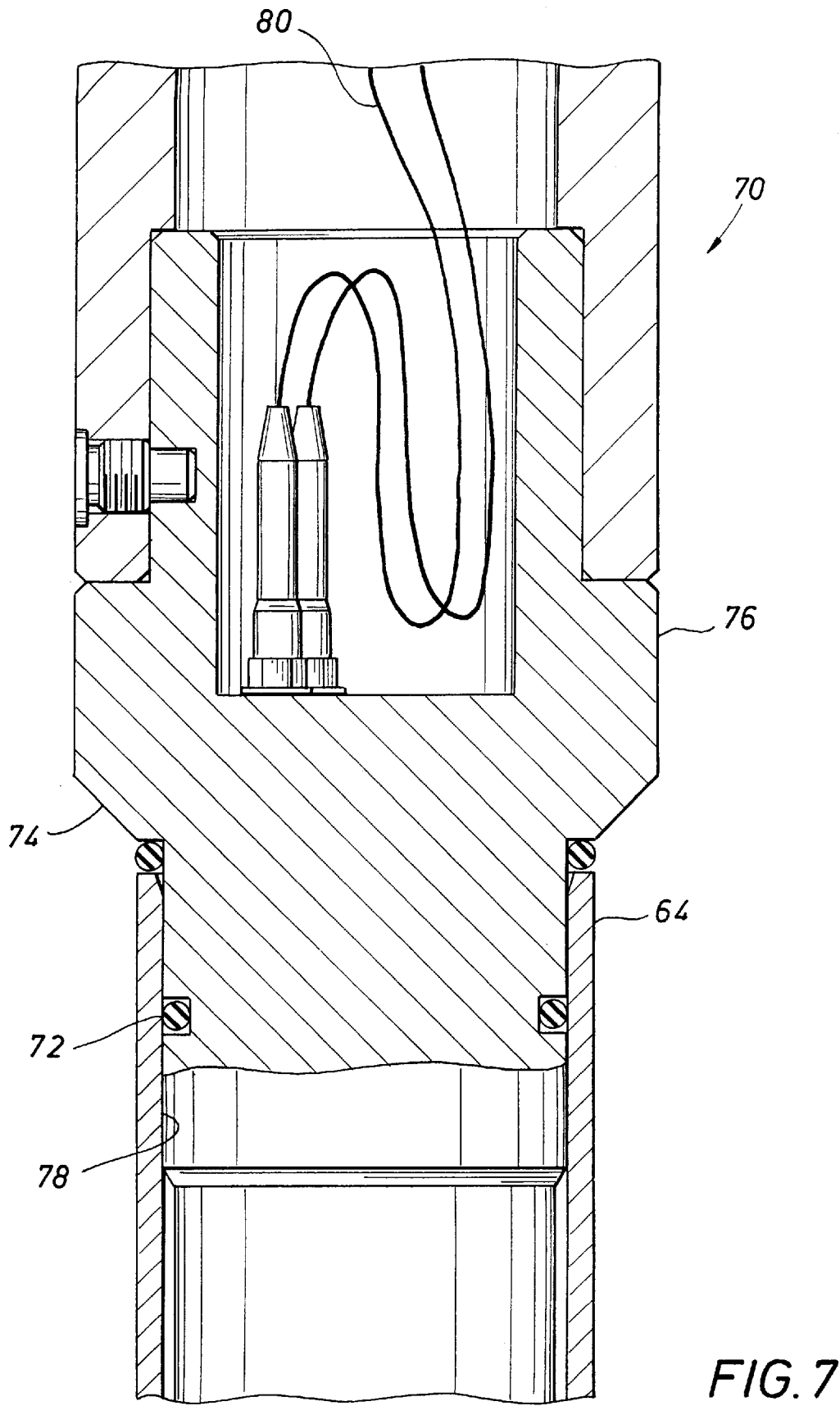
FIG. 7 is a detailed view of either the upper or lower tubular sub at the end of the induction logging tool.

Attention is now directed to FIG. 7 of the drawings which shows either the upper or the lower of the subs 68,70, but the sub 70 is identified for purposes of discussion. The sub 70 is concentric and larger in diameter than the shell 64. Typical sub diameter is between 2 and 4 inches, but can be larger or smaller. The shell 64 terminates at an O-ring seal 72 which is adjacent to a tapered shoulder 74. That shoulder terminates at a cylindrical outer face 76. The sub 70 is preferably formed of a nonmetallic, non conducting material which is either plastic, ceramic or some combination thereof. It is a material which has structural rigidity. Moreover, it is transparent to the radiation of the induction logging tool. In that sense, it preferably has a magnetic permeability of about one. This defines an electromagnetically transparent material. However, it is within contemplation of the subject invention to have a metallic, conducting material comprise sub 70 wherein the material is not transparent to the radiation of the induction logging tool.

The integral construction for the sub 70 extends downwardly into the body of the device. It has a narrow neck 78 which telescopes on the interior of the external shell 64. By suitable connections 80, signals can be input or removed as appropriate. This enables the coils defining the logging tool to properly connect and operate. The operative coils are located inside the elongate cylindrical shell 64.

Optimum Standoff Distance

The standoff in the present disclosure is defined by the depth of the shoulder. It is the distance 48 illustrated in FIG. 6 which defines the difference in diameter between the sub 70 and the shell 64. More specifically, if the sleeve 64 is smaller by about 0.25 inches in radius, this yields a standoff $d_{so}$ which is relatively narrow but which (ignoring service irregularities) defines a gap 48. This gap 48 is appropriately the minimum gap in typical induction logging tools so that excessive distortion does not occur where the coils are touched against the sidewall. Going to FIG. 5, it is desirable therefore to define a standoff gap 48 falling between the values of $d_{so}$ identified by the numerals 52 and 54. This can be achieved by increasing the standoff, i.e., the distance 48 to about 0.4 inches or larger. With a standoff that size, enhanced formation signal sensitivity is obtained and yet the gap 48 is not reduced so that flux concentration becomes unacceptable, and borehole sensitivity becomes prohibitively large and ill behaved. If appropriate dimensions are taken into account for a typical small drill bit drilling operation, the sub 70 has a diameter of about 2 to about 4 inches. The shoulder 74 has a minimum throat or depth of about 0.25 inches and the ideal is around 0.4 inches or greater.

What is claimed is:

1. An induction logging tool comprising:
   (a) an elongated cylindrical, tubular logging tool body having
      (i) a lower tubular body sub having a specified diameter,
      (ii) an upper tubular body sub having said specified diameter,
      (iii) an intermediate elongated tubular support between said upper and lower sub bodies having induction logging coils therein,
      (iv) a serial connector attached to one of said tubular subs to connect serially to a logging tool string so that said induction logging tool and said logging tool string are positioned serially along a well borehole;
   (b) an outer shell defining said intermediate elongated tubular support formed of material enabling said induction logging coils to operate through said shell;
   (c) upper and lower shoulders at the ends of said outer shell wherein said shoulders extend radially to said specified diameter; and
   (d) said shoulders
      (i) cooperate with said outer shell to define a standoff between said outer shell and a well borehole sidewall during logging, and
      (ii) said standoff is sized above a minimum standoff.

2. The induction logging tool of claim 1 wherein said shell comprises an electrically non-conductive material with a permeability of about one.

3. The induction logging tool of claim 2 wherein said upper or lower shoulders comprise an electrically non-conductive material with a relative magnetic permeability of about one.

4. The induction logging tool of claim 3 wherein said upper and lower shoulders form an enclosure about said shell and are formed with circumferential surfaces with respect to an axis through said logging tool body.

5. The induction logging tool of claim 4 wherein said upper shoulder is an integral component of said upper tubular sub body and said lower shoulder is an integral component of said lower tubular sub body.

6. The induction logging tool of claim 5 wherein the outer diameter of said upper shoulder is the same as the outer diameter of said lower shoulder.

7. The induction logging tool of claim 6 wherein said shell forms a hermetic pressure seal about said induction logging coils.

8. The induction logging tool of claim 7 wherein said induction logging coils are positioned between said lower shoulder and said upper shoulder.

9. The induction logging tool of claim 2 wherein said upper or lower shoulders comprise an electrically conductive material.

10. The induction logging tool of claim 1 wherein said specified diameter is between 2 and 4 inches and said minimum standoff is about 0.25 inches.

11. An induction logging method comprising the steps of:
   (a) providing an elongated cylindrical, tubular logging tool having
      (i) a lower tubular body sub having a specified diameter,
      (ii) an upper tubular body sub having said specified diameter,
      (iii) an intermediate elongated tubular outer shell between said upper and lower sub bodies enclosing induction logging coils therein and said coils operate through said shell, (iv) a serial connector attached to one of said tubular sub bodies to connect serially to a logging tool string so that said induction logging tool and said logging tool string are serially extended in a well borehole;

(b) providing upper and lower shoulders at the ends of said outer shell wherein said shoulders
  (i) extend radially to said specified diameter,
  (ii) coorperate with said outer shell to define a standoff between said outer shell and a well borehole sidewall during logging, and
  (iii) said standoff is sized above a minimum standoff, and (c) conveying said logging tool string along said well borehole and measuring an induction log with said induction logging coils radially displaced from said borehole sidewall by a distance equal to or greater than said minimum standoff.

12. The induction logging method of claim 11 wherein said upper and lower shoulders capture said shell there between.

13. The induction logging method of claim 11 including the step of transmitting induction logging signals through said shell.

14. An induction logging method comprising the steps of:
(a) providing an elongated cylindrical, tubular logging tool having
  (i) a lower tubular body sub defining a lower shoulder with a specified diameter,
  (ii) an upper tubular body sub defining an upper shoulder with said specified diameter,
  (iii) an intermediate elongated tubular outer shell between and concentric with said upper and lower subs, and supporting induction logging coils therein with a shell diameter less than said specified diameter; and
(b) conveying said logging tool along said well borehole and measuring an induction log with said induction logging coils radially displaced from said borehole sidewall by a distance equal to or greater than a minimum standoff defined by one half of the difference of said specified diameter and said shell diameter.

15. The induction logging method of claim 14 including the step of logging with eccentered and centralized logging tools.

16. The induction logging method of claim 14 including the additional step of conveying said logging tool along said well borehole with a wireline, coil tubing, or drill pipe.

17. An induction logging tool comprising:
(a) an elongated cylindrical, tubular logging tool body having
  (i) a lower tubular body sub defining a lower shoulder with a specified diameter,
  (ii) an upper tubular body sub defining an upper shoulder with said specified diameter, and
  (iii) an intermediate elongated tubular shell with a specified shell diameter, and positioned between and coaxial with said upper and lower sub bodies supporting induction logging coils therein; and wherein
(b) said specified diameter and said specified shell diameter are selected to define a minimum standoff to reduce distortion in induction log measurements when said logging tool is conveyed along a well borehole with said upper and lower subs against a sidewall of said borehole.

18. The induction logging tool of claim 17 wherein said shell comprises an electrically non-conductive material with a relative magnetic permeability of about one.

19. The induction logging tool of claim 18 wherein said upper or lower subs comprise an electrically non-conductive material with a relative magnetic permeability of about one.

20. The induction logging tool of claim 19 wherein said upper and lower shoulders form an enclosure about said shell and are formed with circumferential surfaces with respect to said axis through said shell.

21. The induction logging tool of claim 19 wherein the taper of said upper shoulder is the same as the taper of said lower shoulder.

22. The induction logging tool of claim 18 wherein said upper or lower subs comprise an electrically conductive material.

23. The induction logging tool of claim 17 wherein said shell forms a hermetic pressure seal about said induction logging coils.

24. The induction logging tool of claim 17 wherein said specified diameter is between 2 and 4 inches and said minimum standoff is about 0.25 inches.

* * * * *